April 3, 1928.
L. W. JONES
MELTING POT
Filed March 10, 1927
1,664,779
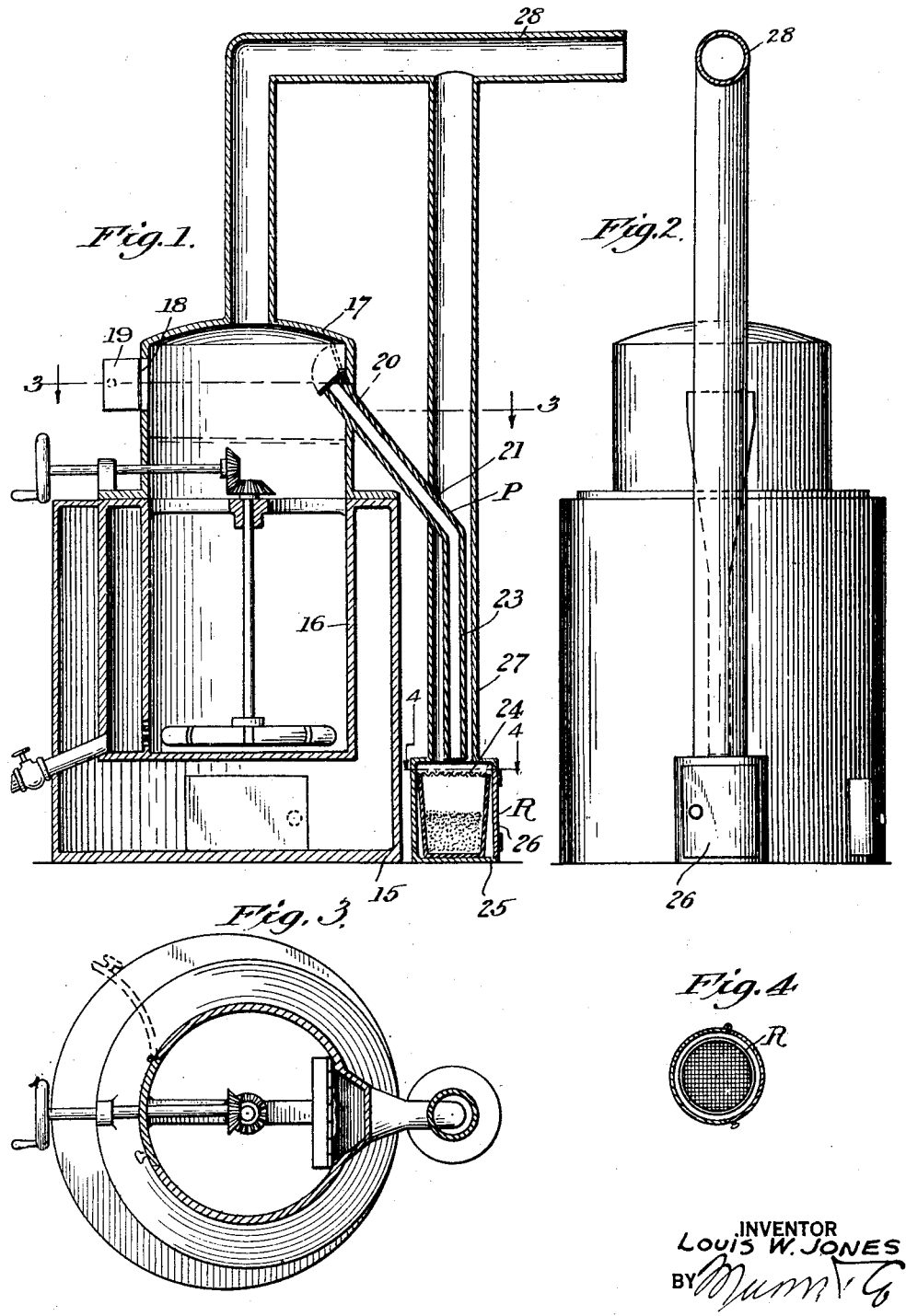
INVENTOR
LOUIS W. JONES
BY 
ATTORNEY Patented Apr. 3, 1928.

1,664,779

UNITED STATES PATENT OFFICE.

LOUIS WARREN JONES, OF LOS ANGELES, CALIFORNIA.

MELTING POT.

Application filed March 10, 1927. Serial No. 174,336.

My invention relates to melting pots as used in the melting of linotype metals of the general character embodied in my Patent No. 1,387,780, issued August 31, 1921.

In melting pots of this character the dross occurring on the surface of the lead or other molten metal, and which it is necessary to remove, is discharged into the atmosphere in the form of a fine powder, thus polluting the air with a deadly poison which in time is fatal to those breathing it.

It is a purpose of my present invention to provide in a melting pot simple, inexpensive and effective means by which the dross can be readily discharged from the pot and collected in a receptacle without polluting the surrounding atmosphere, thus eliminating the danger attendant the operation of such melting pots, as previously explained.

It is also a purpose of my invention to provide in a melting pot means associated with the dross collecting receptacle by which matrices and space bands or any other unmelted articles which are discharged from the pot with the dross are separated from the latter to permit recovery of such articles.

I will describe only one form of melting pot embodying my invention, and will then point out the novel features thereof in claims.

In the drawings

Figure 1 is a view showing in vertical section one form of melting pot embodying my invention;

Figure 2 is a view showing the melting pot in front elevation;

Figure 3 is a horizontal sectional view taken on the line 3—3 of Figure 1;

Figure 4 is a horizontal sectional view taken on the line 4—4 of Figure 1.

Referring specifically to the drawings, my invention in its present embodiment is shown incorporated in a melting pot constructed in accordance with the pot embodied in my patent hereinbefore referred to, and which pot, in the present instance, comprises a hollow body 15 constituting a fire box and into which extends a pot shaped member 16 on which is arranged a dome member 17, the members 16 and 17 providing a chamber in which linotype metal is deposited for melting. The dome 17 is provided with an opening 18 controlled by a door 19, such opening being positioned so as to be disposed well above the normal level of the molten metal in the chamber as illustrated in Figure 1. Diametrically opposed to the opening 18 is an outlet opening 20 in the dome 17 through which dross accumulating on the surface of the molten metal can be ejected or discharged from the pot into a pipe P for conductance to a receptacle R.

This pipe P in the present instance comprises an inclined portion 21, the upper end of which is provided with a horizontal elongated inlet 22 corresponding in contour to that of the outlet opening 20 and communicating with the latter so as to receive the dross as discharged in order that it may be conducted downwardly of the pipe into the receptacle R. The pipe P also includes a vertical portion 23 which communicates at its upper end with the inclined portion 21, its lower end being opened and disposed directly above the receptacle R so as to discharge dross into the receptacle R. The receptacle R as shown is in the form of a bucket, with its mouth spanned by a screen 24 provided for the purpose of separating solid articles, such as matrices or space bands from the dross in a manner to permit the dross to pass freely into the receptacle. By means of this screen the solid articles can be recovered from the dross so that they may be reused if uninjured.

As clearly shown in Figure 1, the receptacle R is housed in an enclosure 25 provided with a door 26 to permit access to the interior of the enclosure for inserting or removing the receptacle. The top of the enclosure 25 is in communication with the lower end of a flue 27 which extends upwardly and is of sufficient diameter to accommodate the vertical portion 23 of the pipe P, the inclined portion 21 of the pipe being extended into the flue through a suitable opening as illustrated in Figure 1. This flue 27 communicates at its upper end with a horizontal portion of an L-shaped flue 28, one end of the latter flue being in communication with the dome 17 and its opposite end extended to any suitable point for conducting the extermely fine dross not deposited in the receptacle R and rising into the hood 17 to a point exteriorly of the building in which the melting pot is located.

To prevent dross from passing upwardly of the pipe P and thus returning to the dome, the pipe portion 21 is extended inwardly of the dome 17 and provided with a door 21ᵃ so hinged as to remain in open position until manually moved to a closed position in which it closes the upper end of the pipe. The door when open permits the dross to be dumped into the pipe.

In practice, the dross accumulating on the surface of the molten metal in the dome 17 can be removed from the pot and discharged into the pipe P by inserting a suitable instrument through the opening 18 so as to skim the dross from the metal and discharge it into the pipe P. The dross thus ejected is conducted downwardly through the pipe P, finally depositing into the receptacle R. Any solid articles contained in the dross will be separated from the latter by means of the screen 24 as previously described. Extremely fine dross capable of floating in the atmosphere will be conducted upwardly of the flue 27 and finally into the flue 28 to atmosphere at a point exteriorly of the building. In this manner none of the dross or fumes therefrom are allowed to escape to the room in which the pot is located and consequently the air does not become polluted with the poisonous dross so injurious to the operators.

Although I have herein shown and described only one form of melting pot embodying my invention, it is to be understood that various changes and modifications may be made without departing from the spirit of the invention, and within the spirit and scope of the appended claims.

I claim:

1. In combination, a melting pot for metals, a dross receptacle, an outlet in the pot through which dross from the surface of the molten metal in the pot can be discharged from the pot, means for conducting the ejected dross to the receptacle, and means correlated with respect to the receptacle for separating unmelted articles, matrices and space bands from the dross to permit recovering thereof.

2. In combination, a melting pot for metals, a dross receptacle, an outlet in the pot through which dross from the surface of the molten metal in the pot can be discharged from the pot, means for conducting the ejected dross to the receptacle, comprising a pipe having a relatively large inlet end in communication with the outlet, an inclined portion extending downwardly from the inlet end, and a vertical communicating with the lower end of the inclined portion and with the receptacle.

3. In combination, a melting pot for metals having a dome provided with an opening above the normal level of molten metal in the pot and an outlet opening through which dross removed from the surface of the metal can be discharged exteriorly of the dome, a receptacle exteriorly of the pot, a pipe in communication with the outlet opening for conducting dross from the dome to the receptacle, an enclosure for the receptacle, a flue surrounding the discharge end of the pipe and in communication with the enclosure for the purpose described.

4. A combination as embodied in claim 3 wherein the dome is provided with a flue in communication with the first flue.

5. In combination, a melting pot for metals having an outlet opening through which dross removed from the surface of metal in the pot can be discharged from the latter, an enclosure in which a dross collecting receptacle is adapted to be placed, and a pipe in communication with the outlet opening and enclosure, through which dross from the pot is adapted to be conducted to and deposited in the receptacle.

6. The combination as embodied in claim 5 wherein a door is provided for and normally closes the outlet opening within the pot.

LOUIS WARREN JONES.